United States Patent [19]

Johnson

[11] Patent Number: 4,787,467

[45] Date of Patent: Nov. 29, 1988

[54] AUTOMATED SELF-SERVICE CHECKOUT SYSTEM

[76] Inventor: Neldon P. Johnson, 1050 E. State Rd., American Fork, Utah 84003

[21] Appl. No.: 79,951

[22] Filed: Jul. 31, 1987

[51] Int. Cl.$^4$ .................. G01G 19/52; G06K 15/00; G06F 15/24

[52] U.S. Cl. ...................................... 177/50; 235/383; 235/385

[58] Field of Search .................... 177/50; 235/383

[56] References Cited

U.S. PATENT DOCUMENTS

| | | | |
|---|---|---|---|
| 3,749,191 | 7/1973 | Ashen et al. | 177/50 X |
| 4,373,133 | 2/1983 | Clyne et al. | 235/383 |
| 4,661,908 | 4/1987 | Hamano et al. | 235/383 X |
| 4,676,343 | 6/1987 | Humble et al. | 235/383 X |

*Primary Examiner*—George H. Miller, Jr.
*Attorney, Agent, or Firm*—K. S. Cornaby

[57] ABSTRACT

An apparatus for self-service check out which calculates, within a main computer, the cumulative total weight of items, based on pre-determined and pre-programmed weights, and compares the computerized cumulative total weight to the weight determined by a second weigh scale means which determines the total weight of all items placed in a receiving container means. Items scanned by electronic means are itemized by the computer which directs the printing of an itemized register tape. Fraudulent mishandling of items by the customer is overcome by communication between the computer and ending weigh scale when weights calculated by each correspond within a determined tolerance level. In an alternate embodiment, a weighing of pre-scanned items in total is required to correspond with the total weight calculated by the computer and the end weigh scale, within a determined tolerance level.

5 Claims, 2 Drawing Sheets

4,787,467

AUTOMATED SELF-SERVICE CHECKOUT SYSTEM

BACKGROUND OF THE INVENTION

This invention relates to an apparatus for the itemization and check out of a miscellany of items which can be operated by the customer in a self-service mode with little or no assistance from a store employee.

By current methods, goods to be purchased by the customer are taken to the checkout counter where a store employee either manually enters the price of the item into a standard industry cash register or passes the item over an electronic scanner for itemization and totalling by computerized machinery. These methods are often time-consuming, causing lengthy lines of waiting customers, particularly at peak shopping hours, and requires numbers of employees to perform the service thus increasing operating expenses.

The present invention is a system for self-service checkout where the customer performs that service which would otherwise have to be performed by a store employee. This system, therefore, has the advantage of reducing operating costs, a savings which can be passed on to the consumer, and actively involves the customer in the checkout process.

Prior art devices, such as those disclosed in U.S. Pat. Nos. 2,919,851 and 3,681,570 cannot prevent fraudulent substitution of higher priced goods because no means is provided for identifying the specific product. The present invention overcomes this problem by incorporating the use of uniform product code identifiers into the system. Further, prior art devices are susceptible to inaccurate weighings because no provision is made for determining where weighing begins or ends. The present invention provides a system of constant monitoring of item weight, individually and in the aggregate, so that at any point if the weights do not agree, an alarm is sounded and resolution is mandated.

It is an object of this invention to provide a substantially fraud-proof system for self-service check out by customers and which system provides a record of weight, price, and name identification of the items purchased.

SUMMARY OF THE INVENTION

The apparatus of the present invention comprises a scanning or reading means for transmitting data obtained from the uniform product code, affixed to the product, to the check out station computer which in turn communicates with a main computer; a combination screen and keyboard means for entering additional information such as specialized product codes or unscannable uniform product codes; a scale means for weighing produce; a transmitting container means for items being purchased; an optional scale means located beneath the transmitting container and upon which the transmitting container rests; a receiving container means into which items are placed after being scanned; and a scale means located beneath the receiving container means and upon which the receiving container rests.

In use, the customer passes each item in succession over the scanner, and the weight, price, product name and other information relative to the product is acknowledged by the computer. The cumulative weight of items then placed in the receiving container is calculated via the scale there beneath and that total is compared with the computers cumulative weight total registered item by item. If the weights do not equal, within a pre-determined tolerance level, the apparatus sounds a warning alarm.

In an alternative embodiment, a scale upon which the transmitting container is placed calculates a beginning weight total. The beginning weight total must equal the cumulatively calculated total from the computer for all items and with the total weight determined by the scale beneath the receiving container. This configuration provides even greater security against fraudulent handling of items. In either embodiment, the customer having totalled his items for purchase, takes the receiving container to the cashier where it is weighed a last time. This procedure insures that nothing has been added to the container after all items have been totalled.

The use of uniform product codes which include the name of the product and its weight serve to prevent fraudulent substitution of higher priced items for lower priced items which have been scanned.

Further objects and features of the invention will become apparent from the following detailed description, taken together with the accompanying drawings.

THE DRAWINGS

The preferred mode for carrying out the invention is illustrated in the accompanying drawings, in which:

FIG. 1 is a flow chart diagram illustrating the steps of use of the apparatus; and FIG. 2 is a side elevational view of the apparatus.

DETAILED DESCRIPTION OF THE PREFERRED EMBODIMENT

Figure 1:
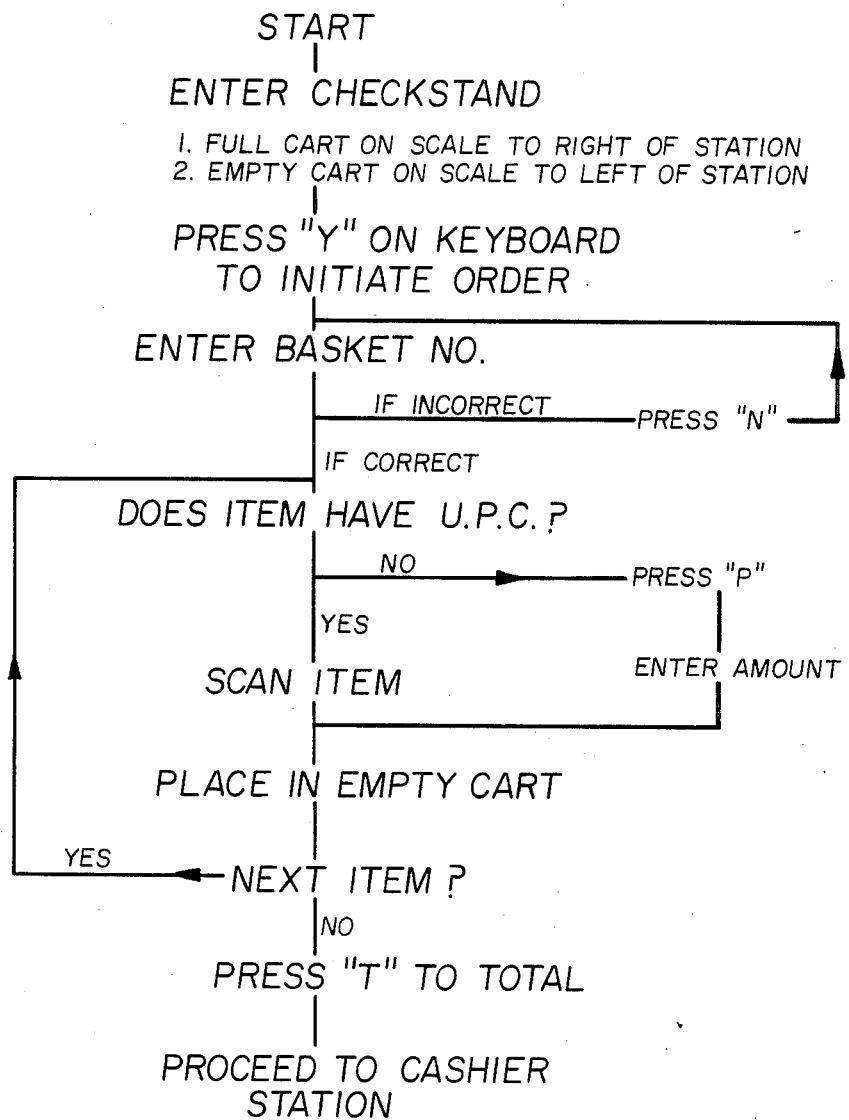

FIG. 1 illustrates the steps to be taken by the customer in proceeding through the checkout procedure.

Figure 2:
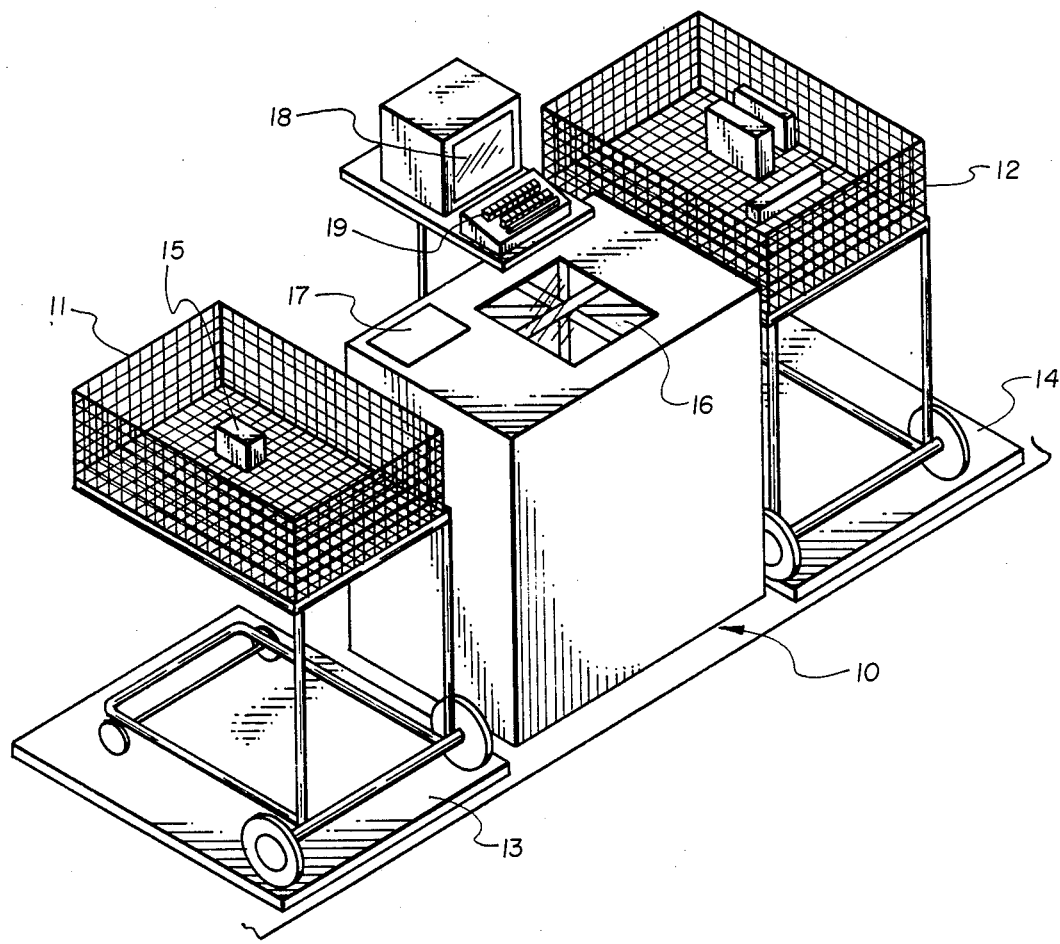

In FIG. 2, the check out station, generally at 10, is shown to have the transmitting container or cart 11 on one side, and the receiving container on cart 12 at the opposite side thereto. The transmitting cart 11 is located on a weighing scale 13 (optional), and the receiving cart 12 is likewise located on a weighing scale 14.

In use, the customer places the transmitting cart 11 at the end of the scanning area, opposite the receiving cart 12. From the transmitting cart 11, the customer passes an item 15 over the scanner 16 which electronically notes the price, weight, product name, and other information, and relays that information to the main computer (not shown). The item is then placed in the receiving cart 12 located upon the weighing scale 14. The main computer, having been pre-programmed with the weight of each item, feeds that information back to the check out station computer (not shown) and compares the weight of the item with the weight as calculated by the scale 14. If the weights are within a determined tolerance level, the system is clear for the scanning of the next item 15. Any discrepancy in the weights above the tolerance level, however, results in a warning alarm being sounded by the system and another item cannot be scanned before the problem is resolved. In this way, the weight of each item is added to the total previous balance of items scanned, and the total weight as calculated by the computer must match the weight as determined by the receiving container scale 14.

Items of produce are placed upon the produce scale 17 and the computer, sensing the placement on the scale, indicates to the customer, via the screen 18, to enter the appropriate produce code on the keyboard 19.

The main computer calculates the price per pound and transmits the information back to the checkout station computer where it is added to the register tape. As above, if any discrepancy exists between the weight registered by the produce scale 18 and the receiving container scale 14 once the produce has been placed into the receiving container 12, an alarm is sounded requesting resolution.

After all items have been scanned and placed into the receiving container 12, the customer enters a request on the keyboard 19 for the total, and the receipt is prepared. The receipt indicates the price, weight, and product name of each item, whether the item is payable by food stamps and a total weight of all items is calculated and noted. The computer also assigns a transaction number which is printed on the register tape.

The customer then takes the receiving container of items to the cashier station (not shown) where the container is weighed once again. This insures that no item or items have been added after totalling. The cashier compares the weights, verifies the transaction code number and receives payment from the customer.

With implementation of the scale means 13 upon which the transmitting container 11 is located, the process is identical to that previously described, except that a total beginning weight is registered with the computer such that the beginning and ending weight totals must equal.

It is understood that in both embodiments, the weighing scale means 13, 14, and 17, scanner 16, and screen 18 and keyboard 19 are all in communication with the main computer.

While this apparatus has been described and shown with respect to a preferred embodiment, it is further understood that there are substantial equivalents which come within the scope of the appended claims.

I claim:

1. An apparatus for a self-service check out system, comprising in combination:
   a check out stand;
   a bar code scanner disposed in said check out stand for scanning a bar code on a scanned product, said code containing product information including price and weight;
   weighing scales for weighing a product receiving basket placed on said scales and for weighing all scanned products placed into said basket;
   computer controlled means for receiving product information from said bar code scanner, determining the weight of a scanned product and comparing it with the weight of the scanned product when placed in the receiving basket to determine if the same product is placed in the basket as was scanned;
   error control means connected to said computer controlled means to stop scanning function of bar scanner if product weight in receiving basket does not match product weight from bar product scanner; and print-out means connected to said computer means for producing a print-out of scanned products with individual prices for each product and a total price for all purchased products.

2. An apparatus as set forth in claim 1, including an additional second weighing scales for weighing a product basket containing all of the products to be scanned and purchased; and including computer controlled means for comparing the weight of total products in the product basket with the weight of products passing over the scanner and the weight of the scanned products in the receiving basket to prevent substitution of one product in the product basket for another in the receiving basket.

3. An apparatus as set forth in claim 1, including produce-weighing means comprising in combination:
   a produce scale;
   entry pad means for the entry of produce bar code information by a customer; and
   computer controlled means for noting the weight and price of the product and entering it upon the ticket.

4. An apparatus as set forth in claim 1, including television camera monitors for monitoring the scanning of products by a cashier.

5. An apparatus as set forth in claim 1, including connecting means for connecting the computer controlled means for receiving scanned product information from the bar code scanner to computer means for maintaining total sales volume to determine when reordering of products should occur.

* * * * *